Figure 1:
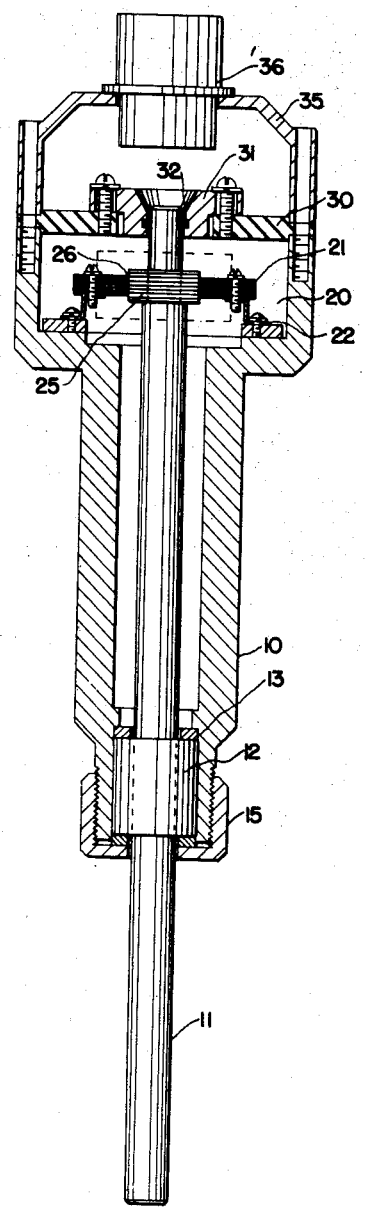

June 14, 1960    J. J. RUDOLF, JR., ET AL    2,941,140
MAGNETIC TRACER HEAD

Filed Jan. 20, 1956

3 Sheets-Sheet 1

INVENTORS
JOHN J. RUDOLF, JR.
HAROLD A. SANDERSON
BY
Joseph E. Ryan
ATTORNEY

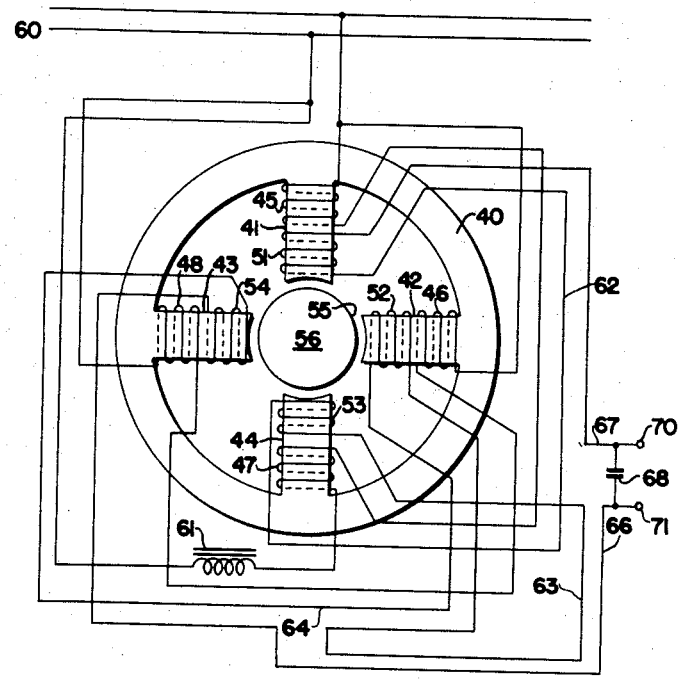
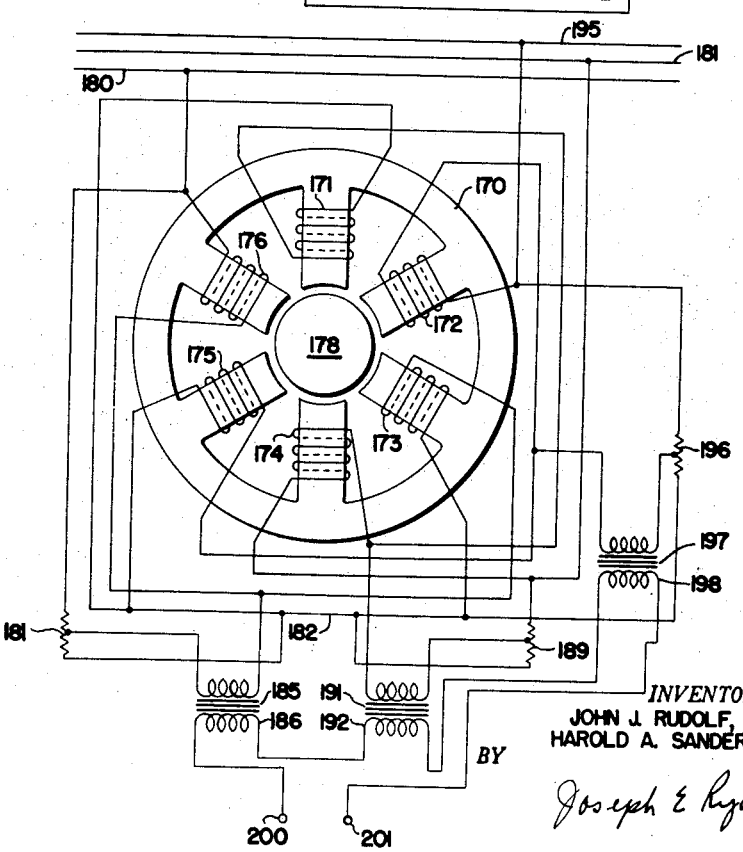

June 14, 1960  J. J. RUDOLF, JR., ET AL  2,941,140
MAGNETIC TRACER HEAD
Filed Jan. 20, 1956  3 Sheets-Sheet 3

*INVENTORS*
*JOHN J. RUDOLF, JR.*
*HAROLD A. SANDERSON*
BY

*Joseph E Ryan*
ATTORNEY

United States Patent Office 2,941,140
Patented June 14, 1960

2,941,140

MAGNETIC TRACER HEAD

John J. Rudolf, Jr., Hopkins, and Harold A. Sanderson, Minneapolis, Minn., assignors to Minneapolis-Honeywell Regulator Company, Minneapolis, Minn., a corporation of Delaware Filed Jan. 20, 1956, Ser. No. 560,431

14 Claims. (Cl. 323—51)

The present invention relates to improvements in an automatic duplicating or recopying apparatus which with precision reproduces a desired shape or outline from a sample or template. More specifically, this invention is directed to an improved magnetic tracer head.

A tracing head or the sensing portion of a recopying servo mechanism produces signals in response to movements or forces on a feeling member associated therewith in the following of a template to normally control the movement of a cutting tool relative to a work piece in one or more axes, or vice-versa, to reproduce the design or profile of the template with which the feeler member is in engagement. The tracer head is normally arranged to deliver two measuring quantities or signals with respect to a pair of quadrature axes which correspond to the adjustments or movements of the work piece or the cutting head to produce the desired copying operation. These signals normally represent the spacing of the feeler member from the template or the force on the feeler member from the template and further the displacement of the work piece from the cutting head with respect to these axes.

In present automatic duplicating or tracer control, these quadrature signals are, through external apparatus, normally combined to present a resultant signal or force factor with reference to a reference direction and this resultant signal is normally modified to introduce auxiliary control effects which make the speed of the cooperating servo mechanism independent of tracing head displacements and which further provide for positioning of the feeler member and hence the cutting tool relative respectively to the template and work piece such that the feeler member will always remain in engagement with the template. This modified signal is utilized to drive separate servo mechanisms in connection with the placement of the work or the cutting head and hence the feeler member relative to the template.

The necessity of utilizing external combining circuitry for such signals provides a rather complex mechanism to produce the desired tracing signals. In the present invention, there is provided an improved magnetic tracing head in which a single output signal is obtained from the head directly, which signal is of the alternating current type and is a rotatable vector variable in magnitude and variable in phase representing the magnitude of displacement or force on the feeler member and the direction of this force or displacement relative to reference axis of the tracing mechanism.

It is therefore an object of this invention to provide an improved magnetic tracing head which produces a single output signal for two or more axes of displacement of a tracing apparatus to indicate displacement or force of the feeler member from a neutral and the direction of displacement of force on the feeler member with respect to reference axis.

It is another object of this invention to provide an improved magnetic tracer head which internally combines signals reflecting displacement of an associated feeler relative to a template in two or more reference axes into a single signal of variable magnitude and variable phase.

It is further an object of this invention to provide an improved magnetic tracer head for multiple channel control which produces a single output signal without the requirement of external circuitry.

Figure 5:
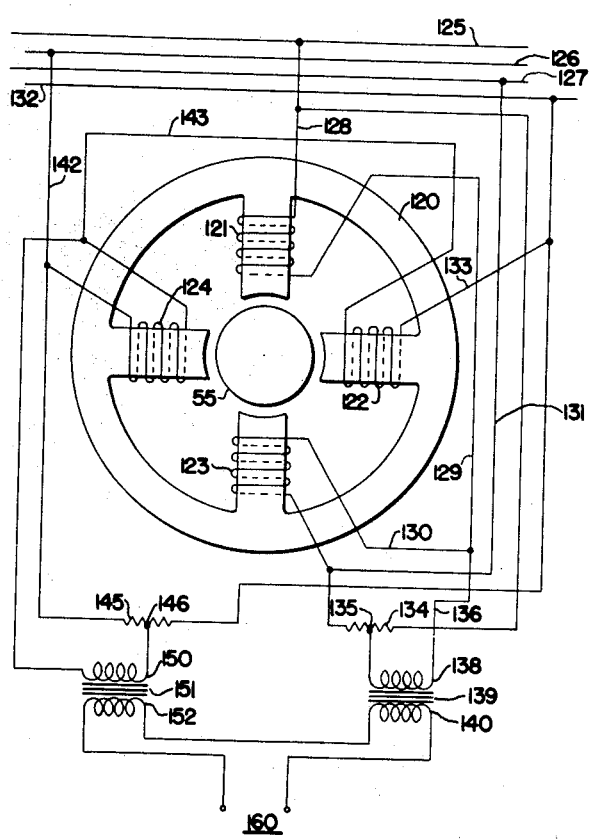
Figure 3:
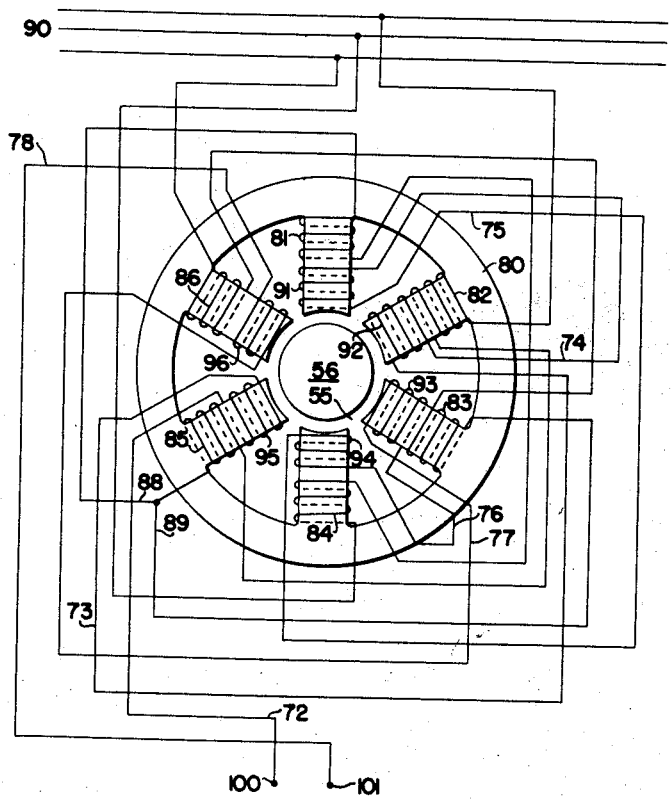
Figure 4:
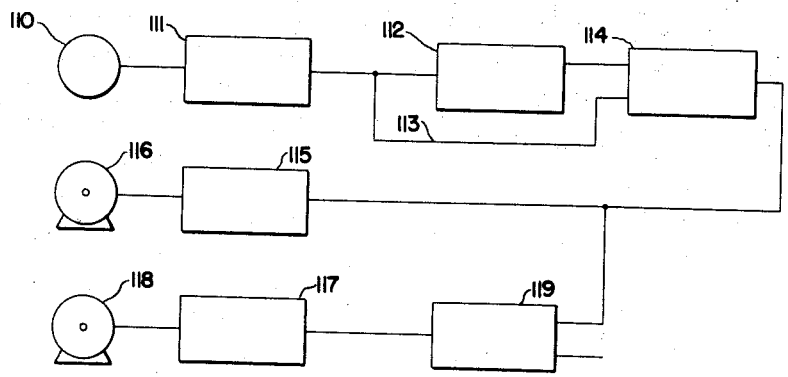

These and other objects of this invention will become apparent from the reading of the attached description together with the drawings wherein:

Figure 1 is a sectional view of our improved magnetic tracing head,

Figure 2 is a schematic diagram of the magnetic and electric portions of the magnetic tracing head, Figure 3 is a schematic view of a second embodiment of the electric and magnetic portions of the improved magnetic tracing head utilizing a slightly modified magnetic structure, Figure 4 is a schematic diagram of the application of the improved magnetic tracing head to a recopying apparatus, and Figures 5 and 6 are schematic diagrams of the other embodiments of an improved magnetic tracing head.

Our improved magnetic tracer head is shown in Figure 1 as including a casing means 10 having a feeler or operating shaft 11 extending therefrom and journaled therein by means of a flexible bushing or rubber bushing 12 which is positioned in a shoulder portion of the casing indicated as 13. Bushing 13 is mounted on the shaft through suitable means to permit universal movement of the feeler or shaft 11 relative to casing 10. A cap 15 positioned on the threaded extremity of the casing secures the shaft and the bushing in a fixed longitudinal position with respect to the casing. While we have shown a flexible bushing or annular rubber rim as providing the journaling means of the shaft on the casing, it will be evident that other suitable journaling means, such as ball type spherical race bearings, may be utilized for this purpose.

The upper extremity of the casing 10 includes a recessed portion 20 in which is positioned a field element 21 of the magnetic tracing head, the field element being secured to the recessed portions of the casing through suitable bracket means located at 22. Cooperating with the field element of the magnetic tracing head is an annular or cylindrically shaped magnetic member 25 which is secured to the feeler member 11 and positioned within a gap 26 in the field element to cooperate with the field structure thereof in a manner to be later defined. Positioned above the field element and magnetic member is a centering support 30 which mounts the centering plate 31 having an O ring 32 or other mechanical centering means therein designed to fit around the upper extremity of the feeler member and allow for the slight translation of movement of the feeler member and hence the magnetic member relative to the field element. A cap 35 having a connector 36 therein is positioned over the open extremity of the casing and is suitably secured thereto by screws, not shown, to assemble the supporting plate on the casing member 10. Electrical connections from windings of the field element to the connector 36 are not shown.

The magnetic structure and the electrical circuitry for the magnetic tracing head is shown in one embodiment in Figure 2 which utilizes a four pole magnetic structure which may be made of a laminated material (see Figure 1). Poles 41–44 of field element 40 have mounted thereon primary windings 45–48 respectively and secondary windings 51–54 respectively. The poles 41–44 are of the salient type and are curved at their extremities to provide a substantially cylindrical or circular air gap 55 therebetween. Positioned within this air gap is the annular or cylindrical magnetic member 56 designed to cooperate with the salient poles and vary the permeability of the flux paths through the poles and the yoke portion of the field element to variably couple the windings thereon. The primary windings 45 and 47 are serially connected with aiding polarity to one another and across an alternating current single phase supply 60 through a phase shift mechanism 61 to produce a predetermined flux pattern in connection with poles 41 and 43. The primary windings 48 and 46 are similarly serially connected with aiding polarity and directly across the single phase supply 60 to produce a magnetic field across poles 43 and 42 which are displaced in phase from the flux field produced across the poles 41-43. In this manner a rotating flux field is obtained for the field element 40 and at the gap 55.

The secondary windings 51, 53 on poles 41, 43 respectively are serially connected in opposition to one another and in a circuit to output terminals 70, 71 as follows: Terminal 70, conductor 67, coil 51, conductor 62, coil 53, conductor 63, coil 52, conductor 64, coil 54, conductor 66 to terminal 71. A condenser 68 is connected in parallel across terminal 70, 71 for filter purposes.

The rotating flux field generated in the field element threads the respective secondary coils 51-54 to produce a resultant signal in each of the windings which is balanced out by the signal of an opposite phase in the secondary winding of the diametrically opposed pole such that a null output is obtained when the magnetic member 56 is in a neutral position equidistantly spaced from alternate poles. Displacement of the magnetic member 56 relative to the respective poles will vary the permeability of the flux paths through the magnetic circuitry of the field element and magnetic member to vary the signals generated in the secondary windings.

In operation this apparatus is somewhat similar to a two phase field structure of a motor in which the respective phase windings of the motor are excited by the voltages that are effectively 90 electrical degrees apart to provide a revolving magnetic field. While the four pole structure does not provide a perfectly cylindrical air gap for the magnetic field, the rate of revolution of the magnetic field will remain constant while the intensity will vary slightly from uniformity. Recognizing that a conductor moving at a constant velocity across a magnetic field will have generated in it a voltage proportional to the instantaneous density of the field, it will be recognized further that a conductor remaining at rest in a moving field of constant velocity will have a voltage similarly produced therein proportional to the instantaneous density of the flux passing therethrough. With the displacement of the magnetic member relative to the neutral or normal position and hence toward or away from the poles 41-43 of the field element 40, the permeability of the flux paths will be modified to vary the field intensity and hence the voltage generated in the secondary windings. By connecting the secondary windings on diametrically opposed poles in opposition to one another, the magnitude of displacement with reference to the poles for these windings will be indicated. By connecting the pairs of secondary winding in a series addition relationship and to the output terminals, the magnitude of displacement of the magnetic member from a normal position is indicated as a vector quantity or electrical signal of an alternating type whose phase relationship with respect to the energizing reference will also provide an indication of displacement of the magnetic member relative to a pair of reference poles. Such reference poles could be those directly energized from the supply. In this manner a single phase output is obtained from the magnetic tracer head which requires no external combination and which could be utilized directly in a servo copying apparatus to be later defined.

The modification shown in Figure 3 is substantially the same as that shown in Figure 2, except that it employs a six pole field element 80 each having a primary and secondary winding thereon. Primary windings 81-86 on the six pole field element are adapted to be connected such that diametrically opposed primary windings are serially connected with adding polarity to one another and to separate conductors of the three phase supply indicated at 90 and with a common connection between the three pairs of primary windings in the form of conductors 88 and 89 tied to the extremity of coil 85 to provide a conventional Y type winding pattern. The air gap 55 for this configuration will be more cylindrical in nature than the conventional four pole unit and the rotating flux field generated by the Y connected windings will present a magnetic flux vector of more uniform density within the air gap. A similar magnetic element 56 could be utilized in connection with this structure and the secondary windings 91-96 would be so connected that secondary windings on the diametrically opposed poles would be serially connected in opposition to one another and with the pairs of windings connected in a series adding manner. The circuit for the secondary windings is as follows: terminal 100, conductor 72, coil 95, conductor 73, coil 92, conductor 74, coil 91, conductor 75, coil 94, conductor 76, coil 93, conductor 77, coil 96, conductor 78 to terminal 101. This field element 80 will present a slightly truer uniform flux field such that the voltage induced in the secondary winding upon displacement of the magnetic member will more accurately define the location of the magnetic member relative to the field element 80.

In operation, the resultant voltage from the three pairs of secondary windings when serially connected to output terminals 100, 101 will produce a voltage the magnitude of which varies with the displacement of the magnetic member 56 relative to the poles or from a neutral position wherein it is equidistantly spaced from the poles and the phase of which will vary depending upon the positioning of the magnetic member relative to a reference pole. The phase of the output signal is referenced to the energizing phase of the pole chosen as a reference pole such that the relationship of the magnetic element with respect to the poles can be determined. In using this embodiment of the magnetic head with two movement axes in a duplicating system, the reference axis for the magnetic head would be aligned with one of the working axes for the work table.

In Figure 4 there is shown the schematic diagram in block form of a typical application for the magnetic tracing head of the subject invention. The head is schematically indicated at 110 as connected to a preamplification stage 111 through a single line connection which indicates the electrical connection therebetween. A portion of the output from the preamp section is connected through a bender circuit (phase shifting) shown as a block 112 which is conventionally employed to insert modifying signals to the system to provide for adjusting the work such that the feeler will always follow the template. A portion of the output is fed directly through a connection indicated at 113 and with the output of the bender circuit is fed to a mixer 114 which combines the signal and connects the resulting signal to the separate discriminating amplifiers having suitable reference signals supplied thereto (not shown) to control the energization of the respective motors of the work table or the tool adjustment mechanisms. The mixer 114 is connected through an X axis amplifier, indicated at 115, to an X axis motor 116 designed to adjust the tool or the work in one of the working axes of the duplicating apparatus while a portion of the output is also fed through a 90° phase shifting mechanism 119 to a Y axis or other axis amplifier 117 to the opposite motor 118 controlling the other working axis or the positioning of the tool or the work with respect to the other working axis of the reproducing mechanism. In this schematic circuitry, single lines are utilized to indicate a plurality of electrical connections and will show that with our improved magnetic tracing head there will be no requirement for combining separate outputs from the magnetic tracing head.

The schematic diagrams shown in Figures 5 and 6 disclose still other embodiments of the improved magnetic tracing head utilizing four pole and six pole structures for the field element but with slightly different electrical connections and coil configurations thereon. Referring to Figure 5 it will be noted that the field element 120 has only four windings thereon numbering 121–124, which are adapted to be connected to a two phase power supply each phase having line conductors 125, 127 and 126, 132 respectively. The windings 121 and 123 are serially connected through conductors 128 leading from lead power line 125 and conductor 129, 130 through coil 123 and conductor 131 to the wire 127. Connected in parallel with the windings 121 and 123 is a tapped resistor element 134 having a tap at 135 whose extremities are connected respectively to the conductors 128 and 131 to provide such parallel connection. The mid point of coils 121 and 123 is connected through a conductor 136 to one extremity of a primary winding 138 of a transformer indicated at 139 having a secondary winding 140, the purpose of which will be later defined. The opposite extremity of primary winding 138 is connected to the tap 135 of the resistor 134. This wiring configuration produces a bridge arrangement with the primary winding 138 connected across the output diagonals of the bridge configuration which is energized from the conductors 125, 127. A similar wiring configuration is provided for the windings 122, 124 with the conductor 126 being connected to a conductor 142 to coil 124 and through a conductor 143 to coil 122 and to the conductor 133 leading to the conductor 132. In parallel with the coils 122, 124 is a resistor element 145 having a tap 146. Connected between the mid point of coils 124 and 122 is a primary winding 150 of a transformer 151 having a secondary winding 152 with the opposite extremity of the primary winding 150 being connected to the tap 146 to provide a second bridge circuit energized from the second phase of the two phase supply. It will be recognized that the energization of the coils from the two phase supply, that is the diametrically opposed pairs of poles from signals displaced in phase produces a rotating magnetic field in this field element 120. Displacement of the magnetic element 55 or member which is again substantially cylindrical or annular in form and is normally equidistantly positioned from the poles of the field element 120 will vary the permeability of the magnetic flux paths through the field element 120. In this wiring configuration, the diametrically opposed pairs of poles are connected in independent separate bridge configurations such that the variation of permeability of the flux paths will vary the inductance of the respective coils to unbalance the bridge circuits and produce in the respective secondary windings of the transformers connected across the outputs of the respective bridges signals of a variable magnitude and phase depending upon the displacement of the magnetic member from the neutral position and of a resultant phase when the secondary windings are connected to a common output which will vary in phase from a reference voltage depending upon the relative positioning of the magnetic member from a reference pole. In this configuration the secondary windings are adapted to be serially connected to output terminals across which the output signal is obtained.

While the induced voltage generated in secondary windings on the poles is not utilized in this configuration, it will be recognized that the rotating magnetic flux field from the polyphase energization of the field element and the variation in permeability of the magnetic flux paths of the field element and magnetic member upon displacement of the magnetic member relative thereto are utilized to vary the inductances of the respective coils and hence unbalance the bridge circuits in which they are located to produce a secondary output in the associated output transformers which will bear the same relationship to the displacement of the magnetic member with the magnitude and phase displacement as did the generated signal in the secondary windings of the aforementioned embodiments.

The configuration shown in Figure 6 utilizes the same principle as that of Figure 5 except that a six pole field element 170 is utilized having poles 171 through 176 thereon which are similarly connected to the separate phases of a three phase energizing supply and to the output transformers with the exception that the three phase windings are all connected at the opposite extremities to a common point such that the three bridges are all common at this point. Thus in the Figure 6, a conductor 180 of the three phase supply is connected to windings 176 and 173 across which the tapped resistor 181 is included in parallel therewith and to a common point or conductor 182 with a transformer 185 being connected between the coils 176 and 173 and the tap of the resistor 181. Similarly line winding 181 is connected to the coils 174 and 171 respectively with the resistor 189 connected in parallel therewith and the transformer 191 connected across the output diagonals of the bridge formed by the coils 171 and 174 and the resistor 189 with the conductor 182 being the common point. The windings 175, 172 are connected from the conductor 195 to the common point 182 with a resistor 196 in parallel therewith and a transformer 197 is connected across the output diagonals of the bridge formed thereby. The output of secondary windings 186, 192 and 198 of the respective transformers 185, 191 and 197 are connected in series together to 200, 201 from which a single output is obtained which is variable with magnitude and variable in phase depending upon the positioning of the magnetic element 178 relative to the respective poles. This embodiment operates in the same manner as that described in connection with Figure 5 to produce the single output signal which reflects the magnitude of displacement of the magnetic member from a neutral position equidistant from all of the poles and a signal which is variable in phase depending upon the direction of the displacement of the magnetic member from a reference pole upon which the reference signal or to which the reference signal is applied.

While we have disclosed our improved magnetic tracer head in connection with the pole structures having a finite number of poles and in various embodiments in which a bridge circuit as well as a transformer principle is employed, it should be recognized that various modifications as to pole configuration and circuit connections may be utilized within the scope of the invention. Therefore we wish to be limited only by our appended claims.

We claim:

1. A magnetic tracer head comprising, a field element having a plurality of poles with an air gap therebetween, casing means mounting said field element, a plurality of primary and secondary windings mounted on said plurality of poles, circuit means connecting said primary windings on each of said poles to an alternating current source of power to produce a rotating magnetic field in said air gap, a plurality of second circuit means connecting each of the secondary windings mounted on diametrically positioned poles in a series subtractive relationship, means connecting said plurality of second circuit means to a common output means, a symmetrical magnetic member positioned in the air gap of said field element in magnetic association with said poles and equidistantly spaced from said poles in a neutral position, a feeler member mounting said magnetic member, and means mounting said feeler member on said casing means for universal movement to permit movement of said magnetic member out of the spaced relationship toward and away from said poles.

2. A magnetic tracer head comprising, a field element having a plurality of poles with a cylindrical air gap therebetween, casing means mounting said field element, a plurality of primary and secondary windings mounted on said plurality of poles, circuit means connecting said primary windings on each of said poles to an alternating current source of power to produce a rotating magnetic field in said air gap, a plurality of second circuit means connecting each of the secondary windings mounted on diametrically positioned poles in an opposing relationship, means connecting said plurality of second circuit means to a common output means, a cylindrical magnetic member positioned normally in a centered relationship in said cylindrical air gap of said field element in magnetic association with said poles, a feeler member mounting said magnetic member, and means mounting said feeler member out of said centered relationship in said air gap on said casing means for universal movement to permit movement of said magnetic member toward and away from said poles.

3. A magnetic tracer head comprising, a field element having four salient poles with a substantially cylindrical air gap therebetween, casing means mounting said field element, a primary and a secondary winding mounted on each of said poles, circuit means including phase shifting means connecting the primary windings on said poles to a single phase alternating current source to produce the rotating magnetic field in said air gap, additional circuit means connecting the secondary windings on diametrically opposed poles in a series subtractive relationship and to a common output means, a symmetrical magnetic member positioned in said air gap of said field element in magnetic association with said poles and equidistantly spaced from said poles in neutral position, a feeler means mounting said magnetic member, and means mounting said feeler means on said casing means for universal movement to permit movement of said magnetic member toward and away from said poles varying the spacing therebetween.

4. A magnetic tracer head comprising, a field element having four poles with a substantially cylindrical air gap therebetween, casing means mounting said field element, primary and secondary windings positioned on each of said poles, circuit means connecting alternate primary windings on said poles to a two phase power supply to produce a rotating magnetic field in said field element, additional circuit means connecting the secondary windings on diametrically positioned poles in opposing relationship and to a common output means, a cylindrical magnetic member positioned in said air gap said field element normally in a centered relationship therewith and in magnetic association with said poles, feeler means mounting said cylindrical magnetic member, and means mounting said feeler means on said casing means for universal movement to permit movement of said magnetic member out of said centered relationship toward and away from said poles.

5. A magnetic tracer head comprising, a field element having six poles with a substantially cylindrical air gap therebetween, casing means mounting said field element, primary and secondary windings positioned on each of said poles, circuit means connecting the alternate primary windings on said poles respectively to each phase of the three phase alternating current source of power to produce a rotating magnetic field in said air gap, additional circuit means connecting the secondary windings on diametrically positioned poles in opposing relationship and to a common output means, a cylindrical magnetic member positioned in said air gap of said field element in a centered relationship therein in magnetic association with said poles, feeler means mounting said cylindrical magnetic member, and means mounting said feeler means on said casing means for universal movement to permit movement of said magnetic member out of said centered relationship toward and away from said poles.

6. A magnetic tracer head comprising, a field element having a plurality of poles with a cylindrical air gap therebetween, casing means mounting said field element, a plurality of primary and secondary windings mounted on said plurality of poles, circuit means connecting said primary windings on each of said poles to an alternating current source of power to produce a rotating magnetic field in said air gap, a plurality of second circuit means connecting each of the secondary windings mounted on diametrically positioned poles in an opposing relationship, means connecting said plurality of second circuit means to a common output means, a cylindrical magnetic member positioned in said cylindrical air gap of said field element in a centered relationship therewith and in magnetic association with said poles, a feeler member mounting said magnetic member, and flexible bushing means mounting said feeler means to said casing means to permit universal movement of said feeler member with said magnetic member thereon out of said centered relationship.

7. A magnetic tracer head comprising, a field element having a plurality of poles with a cylindrical air gap therebetween, casing means mounting said field element, a plurality of primary and secondary windings mounted on said plurality of poles, circuit means connecting said primary windings on each of said poles to an alternating current source of power to produce a rotating magnetic field in said air gap, a plurality of second circuit means connecting each of the secondary windings mounted on diametrically positioned poles in an opposing relationship, means connecting said plurality of second circuit means to a common output means, a cylindrical magnetic member positioned in said cylindrical air gap of said field element in a normally centered relationship therewith and in magnetic association with said poles, a feeler member mounting said magnetic member, and a rubber bushing means mounted on said feeler means and positioned in said casing means to permit universal movement of said feeler and hence said magnetic member out of said centered relationship toward and away from said poles.

8. A magnetic tracer head comprising, a field element having a plurality of poles with a cylindrical air gap therebetween, casing means mounting said field element, a plurality of primary and secondary windings mounted on said plurality of poles, circuit means connecting said primary windings on each of said poles to an alternating current source of power to produce a rotating magnetic field in said air gap, a plurality of second circuit means connecting each of the secondary windings mounted on diametrically positioned poles in an opposing relationship, means connecting said plurality of second circuit means to a common output means, a cylindrical magnetic member positioned in said cylindrical air gap of said field element in a normally centered relationship therewith in magnetic association with said poles, a feeler member mounting said magnetic member, and bearing means mounting said feeler means on said casing means for universal movement of said feeler means to permit the magnetic member to be moved toward and away from said poles out of said centered relationship.

9. A magnetic tracer head comprising, a field element having a plurality of pairs of diametrically opposed poles with a substantially cylindrical air gap therebetween, casing means mounting said field element, a plurality of windings positioned on said poles, circuit means connecting said windings to an alternating current source of power to produce a rotating magnetic field in said air gap, a substantially cylindrical magnetic member positioned in said air gap adapted to be movable relative to said poles from a normally centered position in said gap to vary the reluctance in portions of the magnetic circuit formed by said field element and said magnetic member, additional circuit means electircally associated with said windings on each of the pairs of diametrically opposed poles and connected to a common output means, a feeler member mounting said magnetic member, and means mounting said feeler member on said casing means for universal movement to permit the movement of said magnetic member relative to said poles.

10. A magnetic tracer head comprising, a field element having a plurality of pairs of diametrically opposed poles with a substantially cylindrical air gap therebetween, casing means mounting said field element, a plurality of windings positioned on said poles, circuit means connecting said windings to an alternating current source of power to produce a rotating magnetic field in said air gap, a symmetrical magnetic member positioned in said air gap and adapted to be moveable relative to said poles from a normally centered position in said gap to vary the reluctance in portions of the magnetic circuit formed by said field element and said magnetic member, additional circuit means electrically associated with said windings on each of the pairs of diametrically opposed poles and connected to a common output means, a feeler member mounting said magnetic member, means mounting said feeler member on said casing means for universal movement to permit the movement of said magnetic member relative to said poles, said output means having impressed thereon a resultant alternating signal which varies in magnitude in proportion to the displacement of the magnetic member from a neutral position equidistant from said poles and which varies in phase in proportion to the direction of displacement of said magnetic member with respect to said poles.

11. A magnetic tracer head comprising a field element having a plurality of poles with a substantially cylindrical air gap therebetween, casing means mounting said field element, a plurality of windings positioned on said poles, circuit means connecting at least some of said windings to an alternating current source of power to produce a rotating magnetic field in said air gap, additional circuit means connecting at least some of said windings mounted on diametrically positioned poles to a common output means, a symmetrical magnetic member positioned in said air gap of said field element in magnetic association with said poles and equidistantly spaced from said poles in a neutral position, a feeler means mounting said magnetic member, means mounting said feeler means on said casing means for universal movement to permit movement of said magnetic member toward and away from said poles to vary the spacing between said member and said poles, said output means having impressed thereon a resultant alternating signal which varies in magnitude proportional to the displacement of said magnetic member from a neutral position which varies in phase in proportion to the direction of displacement of said magnetic member with respect to said poles.

12. A magnetic tracer head comprising, a field element having a plurality of pairs of diametrically opposed poles with a substantially cylindrical air gap therebetween, casing means mounting said field element, a plurality of windings positioned on said poles, circuit means connecting said windings to an alternating current source of power to produce a rotating magnetic field in said air gap, a substantially cylindrical magnetic member normally positioned in a centered relationship in said air gap and adapted to be movable relative to said poles out of said centered relationship to vary the reluctance in portions of the magnetic circuit formed by said field element and said magnetic member, additional circuit means connected to said windings on diametrically opposed poles and to a common output means, a feeler means mounting said magnetic member, means mounting said feeler means on said casing means for universal movement to permit the movement of said magnetic member relative to said poles, said output means having impressed thereon a resultant alternating signal which varies in magnitude in proportion to the displacement of the magnetic member from a neutral position equidistant from said poles and which varies in phase in proportion to the direction of displacement of said magnetic member with respect to said poles.

13. A magnetic tracer head comprising, a field element having a plurality of pairs of diametrically opposed poles with a substantially cylindrical air gap therebetween, casing means mounting said field element, a plurality of windings positioned on said poles, circuit means connecting said windings to an alternating current source of power to produce a rotating magnetic field in said air gap, a substantially cylindrical magnetic member positioned in said air gap in a normally centered position therein and adapted to be movable relative to said poles out of said centered position to vary the reluctance in portions of the magnetic circuit formed by said field element and said magnetic member, means including additional electric circuit means electrically coupled to said windings on each of the pairs of diametrically opposed poles and connected to a common output means, a feeler member mounting said magnetic member, and means mounting said feeler member on said casing means for universal movement to permit the movement of said magnetic member relative to said poles, said magnetic member upon relative movement with respect to said poles operating to vary the reluctance in the magnetic circuit and produce in the additional circuit means at said common output means a signal which varies in magnitude in proportion to the relative displacement of said magnetic member with respect to said poles and which varies in phase in proportion to the direction of displacement of the magnetic member with respect to said poles.

14. A magnetic tracer head comprising, a field element having a plurality of pairs of diametrically opposed poles with a substantially cylindrical air gap therebetween, casing means mounting said field element, a plurality of windings positioned on said poles, circuit means connecting said windings to an alternating current source of power to produce a rotating magnetic field in said air gap, a symmetrical magnetic member positioned in said air gap and adapted to be movable relative to said poles from a normally centered position in said air gap to vary the reluctance in portions of the magnetic circuit formed by said field element and said magnetic member, additional circuit means electrically connected to said windings on each of the pairs of diametrically opposed poles and connected to a common output means to form a bridge type network which network is adapted to be unbalanced by variation of the inductance of the windings on the poles caused by variation in the reluctance in the portions of the magnetic circuit with which the windings are associated such that a resultant signal is impressed on said output means which varies in magnitude in proportion to the displacement of the magnetic member from a neutral position equidistant from the poles and which varies in phase in proportion to the direction of displacement of the magnetic member with respect to said poles, a feeler member mounting said magnetic member, and means mounting said feeler member on said casing means for universal movement to permit the movement of the magnetic member relative to said poles.

References Cited in the file of this patent

UNITED STATES PATENTS

| | | |
|---|---|---|
| 1,699,506 | Faus | Jan. 15, 1929 |
| 2,163,448 | Otto | June 20, 1939 |
| 2,207,248 | Garlick | July 9, 1940 |
| 2,666,892 | Heidorn | Jan. 19, 1954 |
| 2,842,749 | Bonnell | July 8, 1958 |

FOREIGN PATENTS

| | | |
|---|---|---|
| 555,042 | Germany | July 19, 1932 |